US011995990B2

(12) United States Patent
Avedisov et al.

(10) Patent No.: US 11,995,990 B2
(45) Date of Patent: May 28, 2024

(54) METHODS AND SYSTEMS FOR MANAGING CONNECTED VEHICLES IN MIXED TRAFFIC

(71) Applicant: Toyota Motor Engineering & Manufacturing North America, Inc., Plano, TX (US)

(72) Inventors: Sergei S. Avedisov, Cupertino, CA (US); Ahmed Hamdi Sakr, Mountain View, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 106 days.

(21) Appl. No.: 17/069,133

(22) Filed: Oct. 13, 2020

(65) Prior Publication Data

US 2022/0114895 A1 Apr. 14, 2022

(51) Int. Cl.
*G08G 1/00* (2006.01)
*G05D 1/00* (2006.01)
*G08G 1/01* (2006.01)

(52) U.S. Cl.
CPC ............. *G08G 1/22* (2013.01); *G08G 1/0133* (2013.01); *G05D 1/0276* (2013.01); *G05D 1/0291* (2013.01)

(58) Field of Classification Search
None
See application file for complete search history.

(56) References Cited

U.S. PATENT DOCUMENTS

| 5,521,817 A | 5/1996 | Burdoin et al. |
| 6,926,233 B1 | 8/2005 | Corcoran, III |

(Continued)

FOREIGN PATENT DOCUMENTS

| CN | 108039053 B | 11/2019 |
| CN | 110400478 A | 11/2019 |

(Continued)

OTHER PUBLICATIONS

Oleg Lola; IoT Case Study—The Internet ofTthings in Automotive Industry, Dec. 8, 2017; 12 pages; https://www.iotcentral.io/blog/list/tag/connected+cars.

(Continued)

*Primary Examiner* — Fadey S. Jabr
*Assistant Examiner* — Mario C Gonzalez
(74) *Attorney, Agent, or Firm* — DINSMORE & SHOHL LLP

(57) ABSTRACT

A method includes receiving, from connected vehicles, first locations of a first set of vehicles in an initial vehicle configuration; receiving, from a roadside unit, second locations of a second set of vehicles in the initial vehicle configuration; determining locations of connected vehicles and non-connected vehicles in the initial vehicle configuration based on the first locations and the second locations; determining an optimal vehicle configuration comprising desired locations of the connected vehicles and the non-connected vehicles based on the locations of the connected vehicles and the non-connected vehicles in the initial vehicle configuration, and predetermined optimization criteria; determining driving maneuvers to be performed by the connected vehicles to achieve the optimal vehicle configuration; and transmitting the determined driving maneuvers to the connected vehicles.

20 Claims, 15 Drawing Sheets

(56) References Cited

U.S. PATENT DOCUMENTS

| | | | |
|---|---|---|---|
| 8,352,111 | B2 | 1/2013 | Mudalige |
| 9,436,187 | B2 | 9/2016 | Arbogast et al. |
| 9,940,840 | B1* | 4/2018 | Schubert ............ G01C 21/3407 |
| 10,252,717 | B2 | 4/2019 | Avedisov et al. |
| 2018/0101736 | A1 | 4/2018 | Han et al. |
| 2018/0188745 | A1* | 7/2018 | Pilkington ............ G05D 1/0295 |
| 2019/0164420 | A1* | 5/2019 | Wendt .................. G05D 1/0293 |
| 2019/0289610 | A1 | 9/2019 | Ju et al. |
| 2019/0311616 | A1 | 10/2019 | Jin et al. |
| 2019/0316919 | A1 | 10/2019 | Keshavamurthy et al. |
| 2020/0005633 | A1 | 1/2020 | Jin et al. |
| 2020/0174496 | A1* | 6/2020 | Hase .................... G05D 1/0293 |
| 2020/0178198 | A1 | 6/2020 | Ding et al. |
| 2021/0171034 | A1* | 6/2021 | Nachnolkar ........... G08G 1/163 |
| 2021/0375127 | A1* | 12/2021 | Kalabic ................ G08G 1/0133 |

FOREIGN PATENT DOCUMENTS

| | | |
|---|---|---|
| WO | 2018132378 A2 | 7/2018 |
| WO | 2019236755 A1 | 12/2019 |

OTHER PUBLICATIONS

Kohei Sakurai et al.; "Connected Car Solutions Based on IoT: Hitachi Review"; 8 pages; accessed Jul. 2, 2020; https://www.hitachi.com/rev/archive/2018/r2018_01/10a05/index.html.

L. Zhang and G. Orosz, "Motif-Based Design for Connected Vehicle Systems in Presence of Heterogeneous Connectivity Structures and Time Delays," in IEEE Transactions on Intelligent Transportation Systems, vol. 17, No. 6, pp. 1638-1651, Jun. 2016, doi: 10.1109/TITS.2015.2509782.

S.S. Avedisov and G. Orosz; "Analysis of Connected Vehicle Networks Using Network-Based Perturbation Techniques"; Nonlinear Dyn 89, 1651-1672 (2017); 22 pages; https://doi.org/10.1007/s11071-017-3541-y.

Y. Li, K. Li, T. Zheng, X. Hu, H. Feng, and Y. Li; "Evaluating the Performance of Vehicular Platoon Control Under Different Network Topologies of Initial States" Physica A: Statistical Mechanics and its Applications. 450: 359-368, 2016; 10 pages.

Z. Zhao & T. Braun; "Topology Control and Mobility Strategy for UAV Ad-Hoc Networks: A Survey"; 2012; 6 pages.

S. Sabino & A. Grilo; "Topology Control of Unmanned Aerial Vehicle (UAV) Mesh Networks: A Multi-Objective Evolutionary Algorithm Approach"; 6 pages; 2018; 45-50. 10.1145/3213526.3213535.

V. Milanes et al.; "Cooperative Adaptive Cruise Control in Real Traffic Situations," in IEEE Transactions on Intelligent Transportation Systems, vol. 15, No. 1, pp. 296-305, Feb. 2014, doi: 10.1109/TITS.2013.2278494.

Jin I. Ge et al; "Experimental Validation of Connected Automated Vehicle Design Among Human-Driven Vehicles"; Transportation Research Part C, 91:335-352, 2018; 8 pages.

* cited by examiner

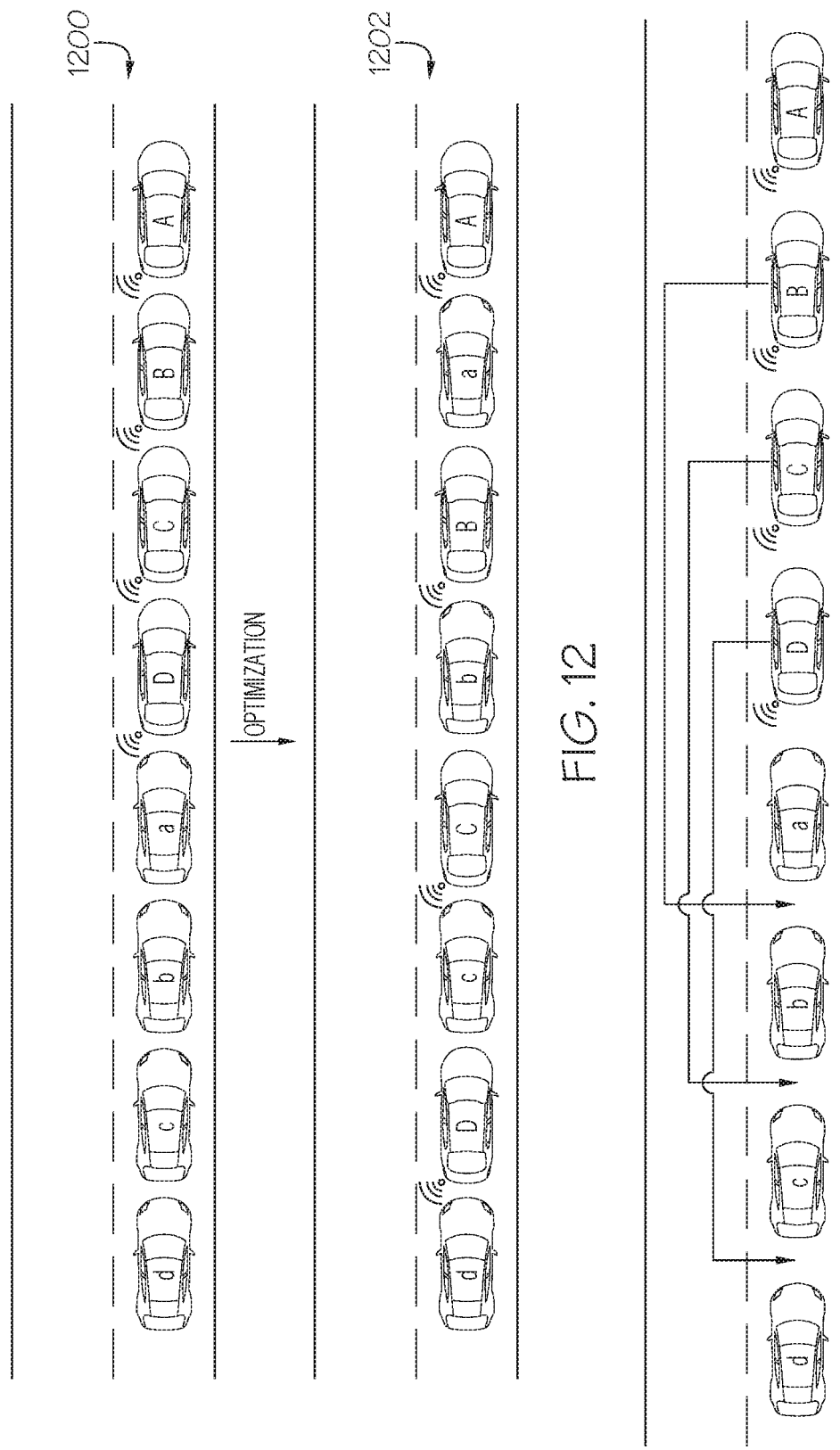

METHODS AND SYSTEMS FOR MANAGING CONNECTED VEHICLES IN MIXED TRAFFIC

TECHNICAL FIELD

The present specification relates to managing connected vehicles, and more particularly, to methods and systems for managing connected vehicles in mixed traffic.

BACKGROUND

Connected vehicles are vehicles that use any of a number of different communication technologies to communicate with systems outside of the vehicle. Connected vehicles may communicate with other vehicles on the road using vehicle-to-vehicle (V2V) communication, or with roadside infrastructure, cloud servers, or other systems using vehicle-to-everything (V2X) communication or other communication protocols. Connected vehicles may transmit and/or receive a wide variety of data including sensor data, map data, weather data, driver intent data, and the like. This data shared by connected vehicles may increase vehicle safety or driving efficiency, may reduce traffic, may increase fuel efficiency, and may have other benefits to drivers and passengers of both the connected vehicles and non-connected vehicles. Connected vehicles may include human driven vehicles, in which data received by a vehicle may be presented to or used to assist the human driver (e.g., through a driving assistance system) and autonomous vehicles, in which the autonomous driving function of the vehicle may be adjusted based on data received by the vehicle.

It is expected that the number of connected vehicles on the road (both human driven and autonomous) will increase around the world in the next several decades. However, it is also expected that non-connected vehicles will continue to be driven in significant numbers. Accordingly, it is expected that mixed traffic (i.e., traffic that involves a combination of connected vehicles and non-connected vehicles) will become more common. As vehicles drive in such mixed traffic situations, there may be certain configurations or formations of connected and non-connected vehicles that lead to improved performance as measured by various metrics (e.g., traffic flow, fuel efficiency, etc.) compared to other vehicle configurations. Accordingly, a need exists for methods and systems for managing connected vehicles in mixed traffic.

SUMMARY

In one embodiment, a method may include receiving, from connected vehicles, first locations of a first set of vehicles in an initial vehicle configuration; receiving, from a roadside unit, second locations of a second set of vehicles in the initial vehicle configuration; determining locations of connected vehicles and non-connected vehicles in the initial vehicle configuration based on the first locations and the second locations; determining an optimal vehicle configuration comprising desired locations of the connected vehicles and the non-connected vehicles based on the locations of the connected vehicles and the non-connected vehicles in the initial vehicle configuration and predetermined optimization criteria; determining driving maneuvers to be performed by the connected vehicles to achieve the optimal vehicle configuration; and transmitting the determined driving maneuvers to the connected vehicles.

In another embodiment, a server may include a controller configured to receive, from connected vehicles, first locations of a first set of vehicles in an initial vehicle configuration; receive, from a roadside unit, second locations of a second set of vehicles in the initial vehicle configuration; determine locations of connected vehicles and non-connected vehicles in the initial vehicle configuration based on the first locations and the second locations; determine an optimal vehicle configuration comprising desired locations of the connected vehicles and the non-connected vehicles based on the locations of the connected vehicles and the non-connected vehicles in the initial vehicle configuration and predetermined optimization criteria; determine driving maneuvers to be performed by the connected vehicles to achieve the optimal vehicle configuration; and transmit the determined driving maneuvers to the connected vehicles.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 12 depicts an example initial configuration and an example desired configuration of connected and non-connected vehicles;

FIG. 13 depicts example driving instructions for the vehicles of FIG. 12 to transition from the initial configuration to the desired configuration;

DETAILED DESCRIPTION

Figure 1:
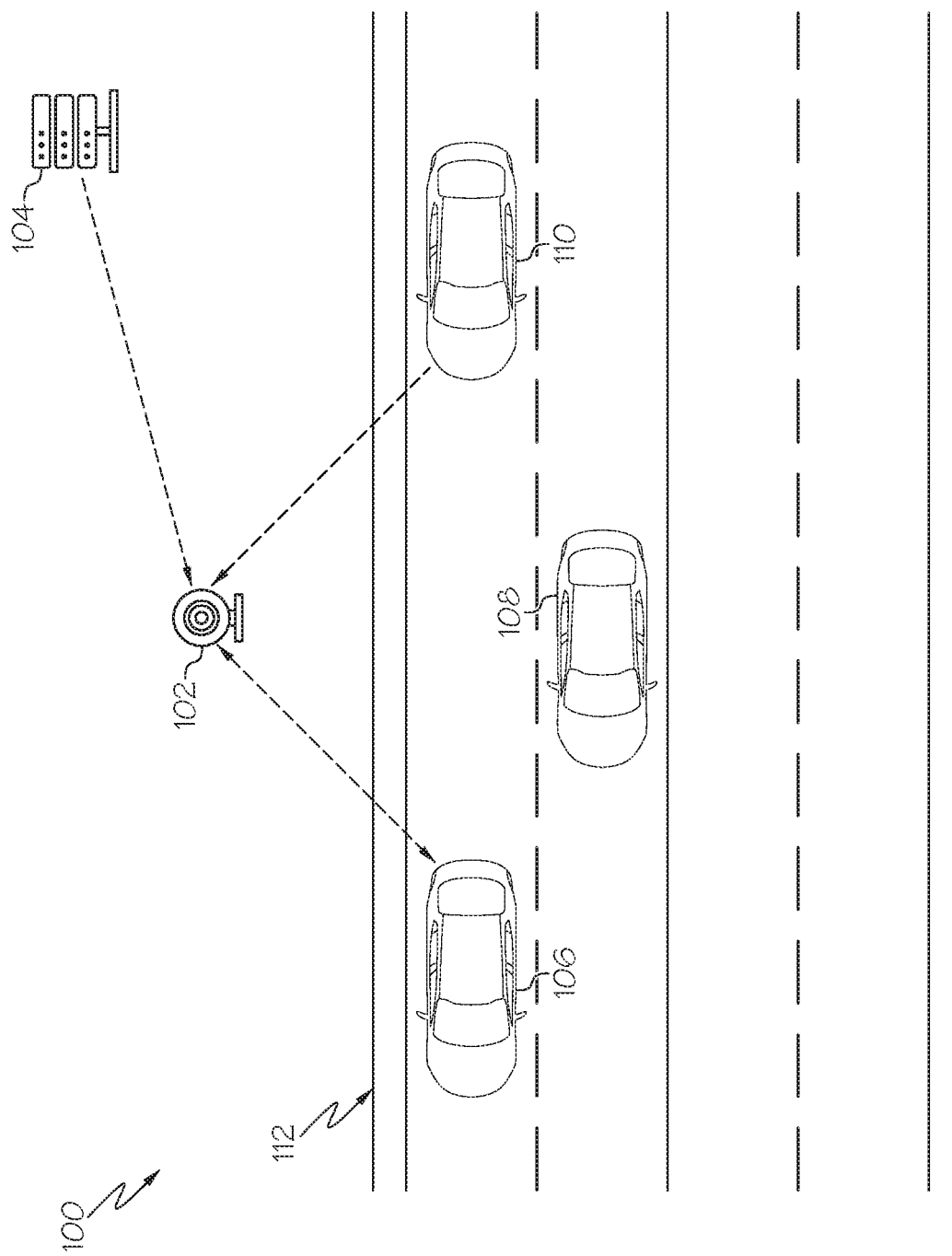
FIG. 1 schematically depicts a system for managing connected vehicles in mixed traffic, according to one or more embodiments shown and described herein.

The embodiments disclosed herein include systems and methods for managing connected vehicles in mixed traffic. In mixed traffic situations involving both connected vehicles and non-connected vehicles, there may be certain configurations or formations of the connected and non-connected vehicles that lead to better traffic flow and/or other beneficial outcomes. This may arise because non-connected vehicles have less perception capabilities than connected vehicles, which are able to receive data from other vehicles or other systems. As such, connected vehicles are able to leverage received data in order to improve driving efficiency or other metrics.

For example, connected vehicles may be more aware of upcoming road conditions, weather conditions, traffic patterns, or other factors that may allow the connected vehicles to adjust their driving behavior accordingly. Alternatively, the driving performance of non-connected vehicles is generally limited by the line of sight of the human driver. Thus, human drivers of non-connected vehicles may make suboptimal driving decisions as compared to connected vehicles, which have more information upon which to make driving decisions.

When a mixed traffic environment comprises both connected vehicles and non-connected vehicles, the overall traffic flow may be affected by the specific configuration or formation of the vehicles. As discussed above, because non-connected vehicles lack the perception capabilities of connected vehicles, drivers of non-connected vehicles tend to make driving errors or perform less efficient driving than human drivers of connected vehicles or autonomous connected vehicles. Furthermore, when several human driven, non-connected vehicles are driven in a row without any connected vehicles between them, the driving errors or inefficiencies made by human drivers tend to be amplified. Alternatively, if one or more connected vehicles are placed between human driven non-connected vehicles in a vehicle configuration, the driving errors or inefficiencies of the human drivers may not be amplified, thereby improving overall traffic flow.

Accordingly, as disclosed herein, connected vehicles and/or roadside units may gather sensor data to determine a current vehicle configuration involving mixed traffic. In particular, the sensor data may be used to determine the current arrangement of vehicles (described herein as a vehicle configuration or a vehicle formation) in a vehicle configuration, including which vehicles are connected vehicles and which vehicles are non-connected vehicles. This data may then be transmitted to an edge server, which may determine an optimal vehicle configuration for the mixed traffic (e.g., by solving an optimization problem to optimize traffic flow or some other metric).

The edge server may determine driving maneuvers for each of the connected vehicles to perform in order to achieve the optimal vehicle configuration. The edge server may then transmit instructions containing the driving maneuvers to be performed by each of the connected vehicles to the respective vehicles. After receiving the instructions, each of the connected vehicles may perform the appropriate driving maneuvers in order to achieve the optimal vehicle configuration.

Turning now to the figures, FIG. 1 schematically depicts a system for managing connected vehicles in mixed traffic. A system 100 includes a roadside unit (RSU) 102 and an edge server 104. The RSU 102 may receive data from one or more connected vehicles, as disclosed herein. In the example of FIG. 1, vehicles 106, 108, and 110 drive along road 112 adjacent to the RSU 102. In the example of FIG. 1, vehicle 106 may be an autonomous connected vehicle, vehicle 108 may be a human driven, connected vehicle, and vehicle 110 may be a human driven, non-connected vehicle. However, it should be understood that in other examples, the system 100 may operate with any number of vehicles, including any number of human driven connected vehicles, any number of autonomous connected vehicles, and any number of non-connected vehicles. Each of the vehicles 106, 108, 110 may be an automobile or any other passenger or non-passenger vehicle such as, for example, a terrestrial, aquatic, and/or airborne vehicle including, but not limited to, a bus, a scooter, a drone, and a bicycle.

The RSU 102 is communicatively coupled to the vehicles 106, 108. The RSU 102 may be positioned near the road 112 such that it can be communicatively coupled to the vehicles, 106, 108. The system 100 may include any number of RSUs spaced along the road 112 such that each RSU covers a different service area. That is, as the vehicles 106, 108 drive along the road 112, the vehicles may be in range of different RSUs at different times such that a RSU provides coverage at different locations. Thus, as the vehicles 106, 108 drive along the road 112, they may move between coverage areas of different RSUs.

The RSU 102 may also be communicatively coupled to the edge server 104. If the system 100 comprises a plurality of RSUs, multiple RSUs may be connected to the edge server 104. In addition, the system 100 may include multiple edge servers, with each edge server being communicatively coupled to one or more RSUs. In some examples, the edge server 104 may be a moving edge server, such as another vehicle on the road 112. Another vehicle as the moving edge server may be a lead vehicle of a vehicle platoon. For example, another vehicle and connected vehicles 106 and 108 may constitute a vehicle platoon. In some examples, the edge server 104 may be a cloud-based server.

As connected vehicles drive along the road 112, the connected vehicles may gather sensor data and may transmit the sensor data to the edge server 104. The RSU 102 may also gather sensor data regarding vehicles on the road 112 and may transmit this sensor data to the edge server 104. The edge server 104 may receive the sensor data from the vehicles and from the RSU 102 and may determine an initial vehicle configuration (e.g., current positions of connected and non-connected vehicles) based on the received data. The edge server 104 may then determine an optimal vehicle configuration based on the initial vehicle configuration. The edge server 104 may further determine driving maneuvers to be performed by the connected vehicles in order to achieve the optimal vehicle configuration from the initial configuration based on certain optimization criteria. The edge server 104 may send instructions containing the driving maneuvers to the appropriate connected vehicles. The connected vehicles may then perform the driving maneuvers contained in the instructions to transform the initial vehicle configuration into the desired vehicle configuration.

In some examples, the system 100 may not include the RSU 102 and the functions described herein as being performed by the RSU 102 may be performed by the edge server 104. In other examples, the system 100 may not include the edge server 104 and the functions described herein of the edge server 104 may be performed by the RSU 102. Additional details of the connected vehicles, the RSU 102, and the edge server 104 are discussed below.

Figure 2:
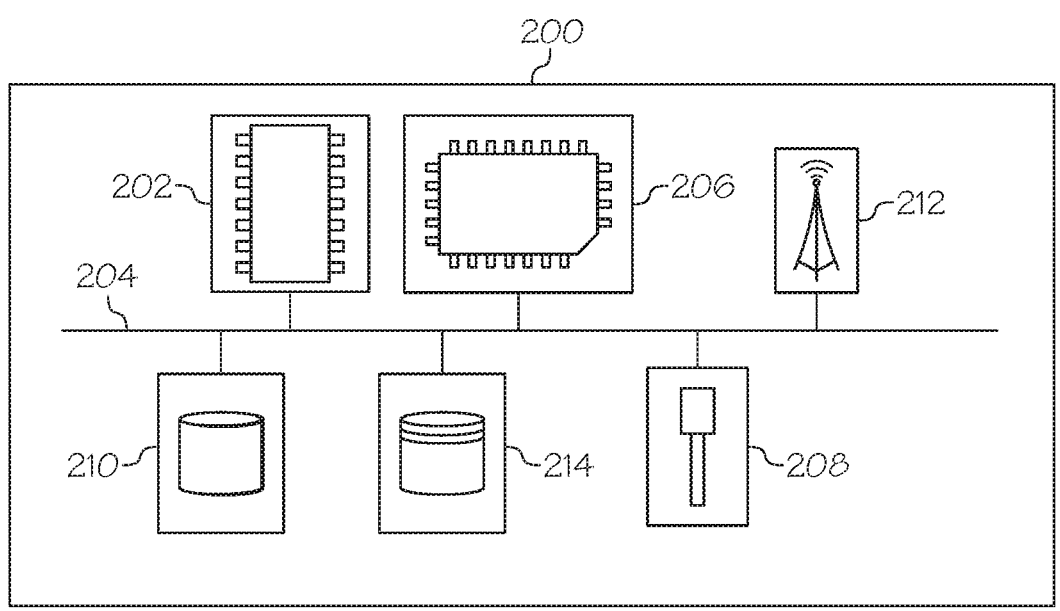
FIG. 2 depicts a schematic diagram of a vehicle system, according to one or more embodiments shown and described herein.

FIG. 2 depicts a vehicle system 200 included in the vehicles 106 and 108 of FIG. 1. The vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs. The vehicle system 200 may be included in a human driven connected vehicle and in an autonomous connected vehicle.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more sensors 210 may include, but are not limited to, LiDAR sensors, RADAR sensors, optical sensors (e.g., cameras, laser sensors, proximity sensors, location sensors (e.g., GPS modules)), and the like. In embodiments, the sensors 210 may monitor the surroundings of the vehicle and may detect other vehicles on the road. In particular, the sensors 210 may determine locations of other vehicles (which may be connected vehicles and/or non-connected vehicles). For example, in the example of FIG. 1, the sensors 210 of the vehicle 108 may detect the vehicles 106 and 110 and determine their locations relative to the location of the vehicle 108. In some examples, the sensors 210 may determine other information about detected vehicles (e.g., speeds of vehicles).

For autonomous vehicles, the vehicle system 200 may include an autonomous driving module (not shown) and the data gathered by the sensors 210 may be used by the autonomous driving module to autonomously navigate the vehicle. In both autonomous and non-autonomous connected vehicles, the data gathered by the sensors 210 may be used to manage connected vehicles, as disclosed in further detail below.

Still referring to FIG. 2, the vehicle system 200 comprises network interface hardware 212 for communicatively coupling the vehicle system 200 to the edge server 104 and/or another vehicle system. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit sensor data gathered by the sensors 210 to the edge server 104. In other embodiments, the network interface hardware 212 may transmit sensor data to the RSU 102.

Still referring to FIG. 2, the vehicle system 200 comprises a data storage component 214. The data storage component 214 may store data used by various components of the vehicle system 200. In addition, the data storage component 214 may store data gathered by the sensors 210.

The vehicle system 200 may also include an interface (not shown). The interface may allow for data to be presented to a human driver and for data to be received from the driver. For example, the interface may include a screen to display information to a driver, speakers to present audio information to the driver, and a touch screen that may be used by the driver to input information. In other examples, the vehicle system 200 may include other types of interfaces.

In some embodiments, the vehicle system 200 may be communicatively coupled to the RSU 102 by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
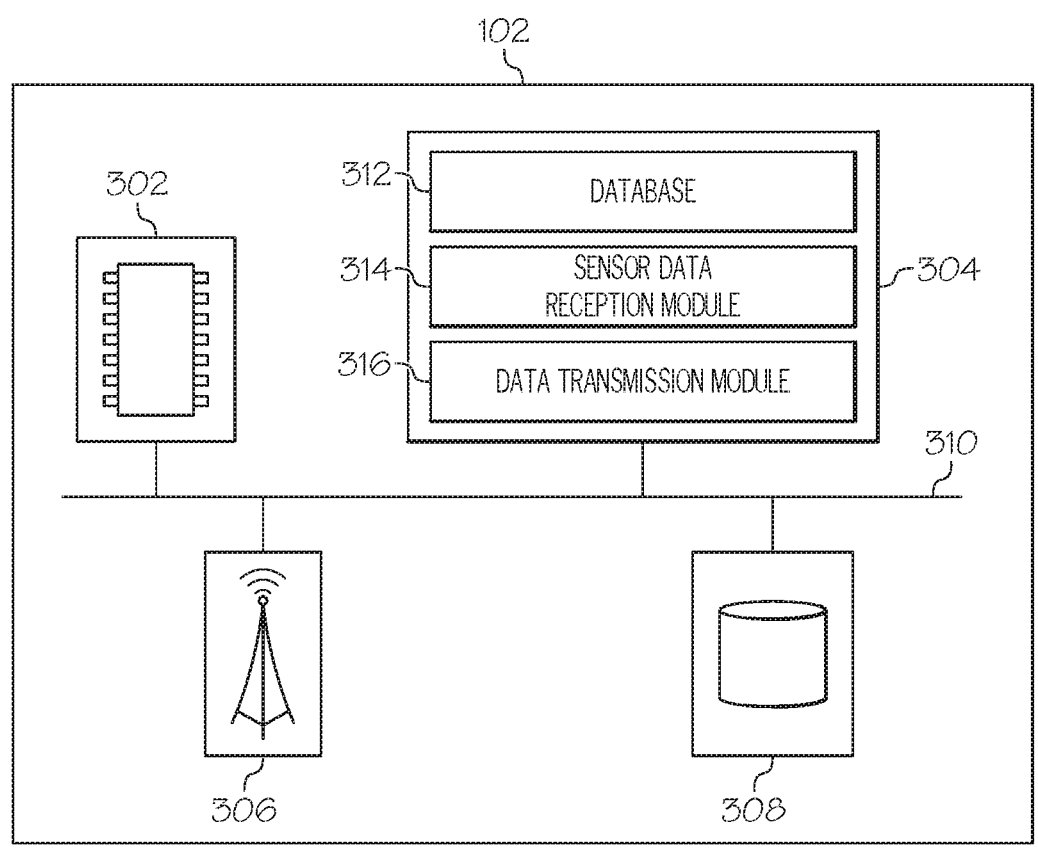
FIG. 3 depicts a schematic diagram of a roadside unit that may be part of the system of FIG. 1, according to one or more embodiments shown and described herein.

Now referring to FIG. 3, the RSU 102 comprises one or more processors 302, one or more memory modules 304, network interface hardware 306, one or more sensors 308 and a communication path 310. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 310 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the RSU 102 may transmit and receive data to and from connected vehicles (e.g., vehicles 106 and 108) and may transmit and receive data to and from the edge server 104.

The one or more sensors 308 may include, but are not limited to, LiDAR sensors, RADAR sensors, optical sensors (e.g., cameras, laser sensors, proximity sensors, location sensors (e.g., GPS modules)), and the like. In embodiments, the sensors 308 may monitor and detect vehicles traveling along a road (e.g., the vehicles 106, 108, 110 of FIG. 1). In particular, the sensors 308 may determine positions of one or more vehicles traveling along a road. In the example of FIG. 1, the sensors 308 of the RSU 102 may be positioned along the road 112 and may use image data (e.g., camera images) to detect the locations of the vehicles 106, 108, 110. In some examples, the RSU 102 may use other types of sensor data to determine vehicle locations. In some examples, the sensors 308 may determine other information about detected vehicles (e.g., speeds of vehicles).

The one or more memory modules 304 include a database 312, a sensor data reception module 314, and a data transmission module 316. Each of the database 312, the sensor data reception module 314, and the data transmission module 316 may be a program module in the form of operating systems, application program modules, and other program modules stored in one or more memory modules 304. In some embodiments, the program module may be stored in a remote storage device that may communicate with the RSU 102. In some embodiments, one or more of the database 312, the sensor data reception module 314, and the data transmission module 316 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may temporarily store data collected by the one or more sensors 308. The database 312 may also store other data that may be used by the memory modules 304 and/or other components of the RSU 102.

The sensor data reception module 314 may receive data captured by the one or more sensors 308. In one example, the RSU 102 may be positioned along a side of a road and the sensor 308 may comprise a camera. In this example, the sensor 308 (e.g., a camera) may capture images of the road which may be received by the sensor data reception module 314. The sensor data reception module 314 may identify one or more vehicles in captured images (e.g., using image processing techniques). The sensor data reception module 314 may also determine locations of identified vehicles based on the data captured by the one or more sensors 308 (e.g., using image processing or other techniques). The data received by the sensor data reception module 314 and/or vehicle locations determined by the sensor data reception module 314 may be stored in the database 312.

Referring still to FIG. 3, the data transmission module 316 may transmit data to the edge server 104. In particular, the data transmission module 316 may transmit vehicle location data comprising locations of vehicles determined by the sensor data reception module 314. The edge server 104 may use the vehicle location data to determine an optimal vehicle configuration, as described in further detail below.

Figure 4:
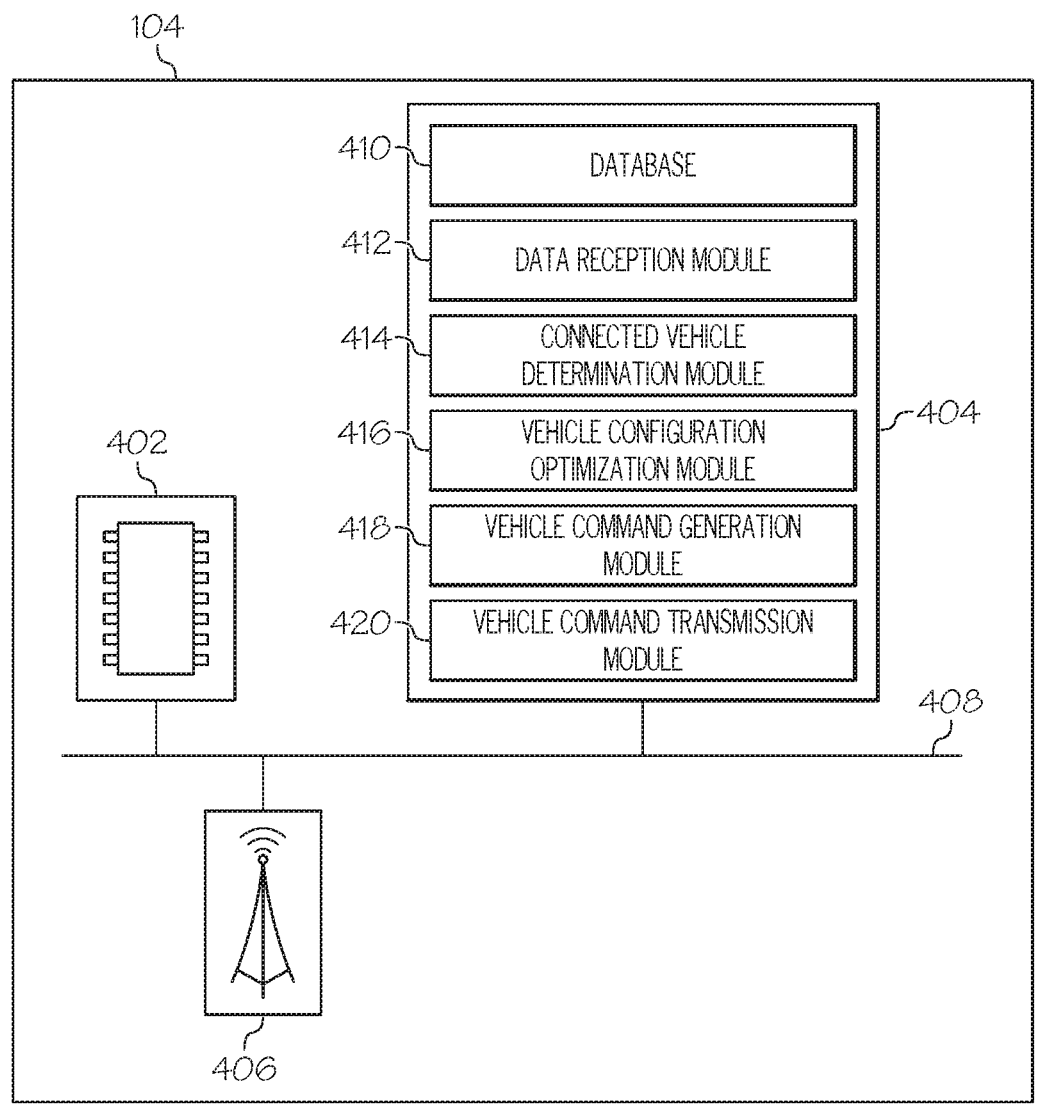
FIG. 4 depicts a schematic diagram of an edge server that may be part of the system of FIG. 1, according to one or more embodiments shown and described herein.

Now referring to FIG. 4, the edge server 104 comprises one or more processors 402, one or more memory modules 404, network interface hardware 406, and a communication path 408. The one or more processors 402 may be a controller, an integrated circuit, a microchip, a computer, or any other computing device. The one or more memory modules 404 may comprise RAM, ROM, flash memories, hard drives, or any device capable of storing machine readable and executable instructions such that the machine readable and executable instructions can be accessed by the one or more processors 402.

The network interface hardware 406 can be communicatively coupled to the communication path 408 and can be any device capable of transmitting and/or receiving data via a network. Accordingly, the network interface hardware 406 can include a communication transceiver for sending and/or receiving any wired or wireless communication. For example, the network interface hardware 406 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 406 includes hardware configured to operate in accordance with the Bluetooth® wireless communication protocol. The network interface hardware 406 of the edge server 104 may transmit and receive data to and from connected vehicles (e.g., vehicles 106 and 108 in the example of FIG. 1) and the RSU 102.

The one or more memory modules 404 include a database 410, a data reception module 412, a connected vehicle determination module 414, a vehicle configuration optimization module 416, a vehicle command generation module 418, and a vehicle command transmission module 420. Each of the database 410, the data reception module 412, the connected vehicle determination module 414, the vehicle configuration optimization module 416, the vehicle command generation module 418, and the vehicle command transmission module 420 may be a program module in the form of operating systems, application program modules, and other program modules stored in one or more memory modules 404. In some embodiments, the program module may be stored in a remote storage device that may communicate with the edge server 104. In some embodiments, one or more of the database 410, the data reception module 412, the connected vehicle determination module 414, the vehicle configuration optimization module 416, the vehicle command generation module 418, and the vehicle command transmission module 420 may be stored in the one or more memory modules 304 of the RSU 102. Such a program module may include, but is not limited to, routines, subroutines, programs, objects, components, data structures and the like for performing specific tasks or executing specific data types as will be described below.

Still referring to FIG. 4, the database 410 may temporarily store data received from connected vehicles and/or the RSU 102. This data may include vehicle configuration data comprising positions of connected and non-connected vehicles in a vehicle configuration. The database 410 may also store other data that may be used by the other components of the edge server 104.

Still referring to FIG. 4, the data reception module 412 may receive data from connected vehicles and from the RSU 102. As explained above, connected vehicles (e.g., vehicles 106 and 108 of FIG. 1) and the RSU 102 may transmit vehicle location data comprising locations of connected and non-connected vehicles in a vehicle configuration as determined by connected vehicles and the RSU 102, respectively. This data may be received by the data reception module 412. By receiving data from both connected vehicles and the RSU 102, the edge server 104 may combine the received data to more accurately determine locations of vehicles in a vehicle configuration.

In embodiments, the data reception module 412 may fuse the data received from connected vehicles and from the RSU 102 into a single coordinate system. For example, if data received by the data reception module 412 comprises relative locations of vehicles (e.g., with respect to connected vehicles and/or the RSU 102), the data reception module 412 may translate those relative locations into absolute locations based on the relative locations and the locations of the connected vehicles sending the data and the RSU 102. As such, the locations of vehicles received from various connected vehicles and from the RSU 102 may be directly compared and aggregated. In some examples, the edge server 104 may only receive vehicle location data from connected vehicles. In other examples, the edge server 104 may only receive vehicle location data from the RSU 102.

In some examples, the data reception module 412 may receive raw sensor data captured by sensors 210 of a vehicle system 200 (e.g., image data) and raw sensor data captured by the sensors 308 of the RSU 102. In these examples, the data reception module 412 may identify vehicles and may determine locations of identified vehicles based on the raw sensor data (e.g., by using image processing techniques). In other examples, the vehicle system 200 and the RSU 102 may identify vehicles and determine locations of identified vehicles based on sensor data captured by the sensors 210 and 308, respectively, and may transfer this data to the edge server 104, which may be received by the data reception module 412. The data received by the data reception module 412 may be stored in the database 410.

In embodiments, the data reception module 412 may also receive locations of the connected vehicles that are transmitting sensor data (e.g., locations of the connected vehicles as determined by satellite antenna 208 of the connected vehicles themselves). The locations of the connected vehicles may be used by the connected vehicle determination module 414 to determine which identified vehicles are connected vehicles, as explained in further detail below.

Still referring to FIG. 4, the connected vehicle determination module 414 may determine which vehicles identified by connected vehicles and/or the RSU 102 are connected vehicles and which vehicles are non-connected vehicles. In one example, the connected vehicle determination module 414 may determine which identified vehicles are connected vehicles by comparing the locations of vehicles identified by the sensors 210 of connected vehicles and the sensors 308 of the RSU 102 to the self-identified locations of the connected vehicles (e.g., locations of connected vehicles determined by the satellite antenna 208 of the connected vehicles themselves), as explained herein.

As explained above, the data reception module 412 may receive location data of vehicles detected by the sensors 210 of one or more connected vehicles as well as self-identified locations of each of the connected vehicles transmitting sensor data. As such, the connected vehicle determination module 414 may crosscheck the self-identified locations of connected vehicles against the vehicle locations determined based on the sensor data collected by the sensors 210 of connected vehicles and/or the sensors 308 of the RSU 102. If a self-identified location of a connected vehicle matches a location of an identified vehicle determined based on sensor data, the connected vehicle determination module 414 may determine that the identified vehicle is a connected vehicle. Alternatively, if a location of an identified vehicle determined based on sensor data does not match any self-identified locations of connected vehicles, the connected vehicle determination module 414 may determine that identified vehicle is a non-connected vehicle.

Figure 9:
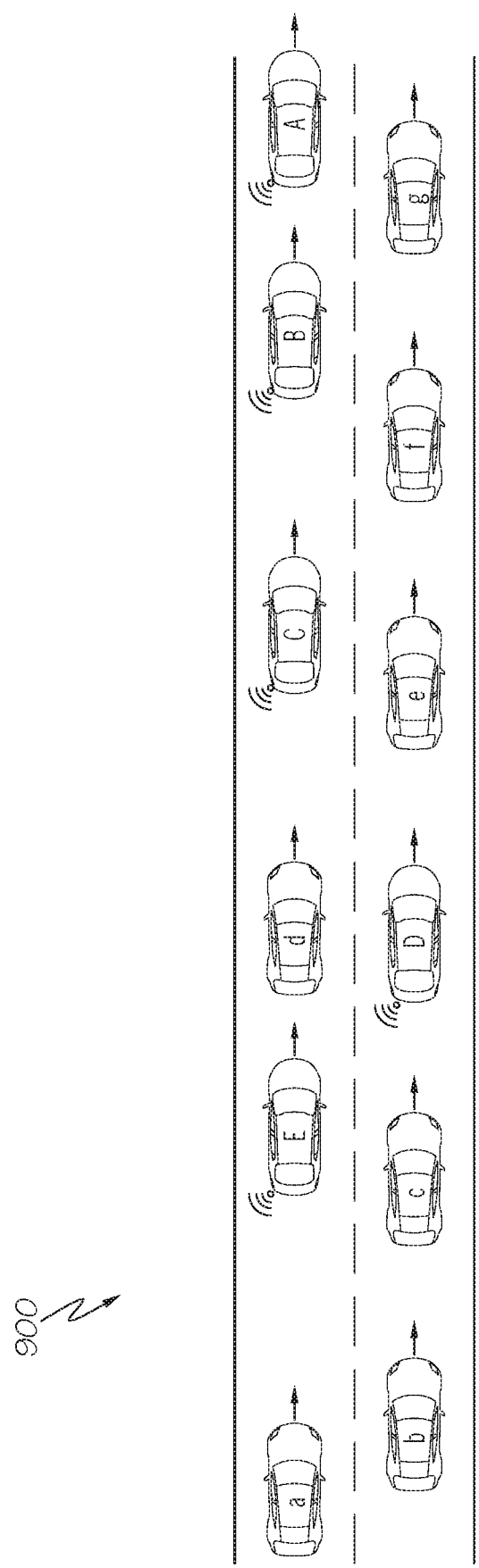
FIG. 9 depicts an example vehicle configuration of connected and non-connected vehicles.

Thus, the connected vehicle determination module 414 may determine which identified vehicles are connected vehicles and which identified vehicles are non-connected vehicles. This may allow for a determination of a vehicle configuration comprising one or more connected vehicles and one or more non-connected vehicles. For example, FIG. 9 shows a vehicle configuration 900 comprising connected vehicles A, B, C, D and E and non-connected vehicles a, b, c, d, e, f and g, which may be determined by the connected vehicle determination module 414. In other examples, other methods of determining which identified vehicles are connected vehicles and which identified vehicles are non-connected vehicles may be used (e.g., making the determination directly from sensor data).

Still referring to FIG. 4, the vehicle configuration optimization module 416 may determine an optimal vehicle configuration based on a current vehicle configuration received by the data reception module 412. That is, given a current vehicle configuration comprising a number of connected vehicles and non-connected vehicles, the vehicle configuration optimization module 416 may determine an optimal vehicle configuration comprising the connected and non-connected vehicles. In particular, the vehicle configuration optimization module 416 may determine an optimal vehicle configuration such that certain constraints are maximized, as disclosed herein.

As explained above, certain vehicle configurations involving mixed traffic (i.e., a combination of connected vehicles and non-connected vehicles) may have improved traffic flow compared to other configurations. In addition, certain vehicle configurations involving mixed traffic may show improvements in other metrics (e.g., fuel efficiency).

Figure 10:
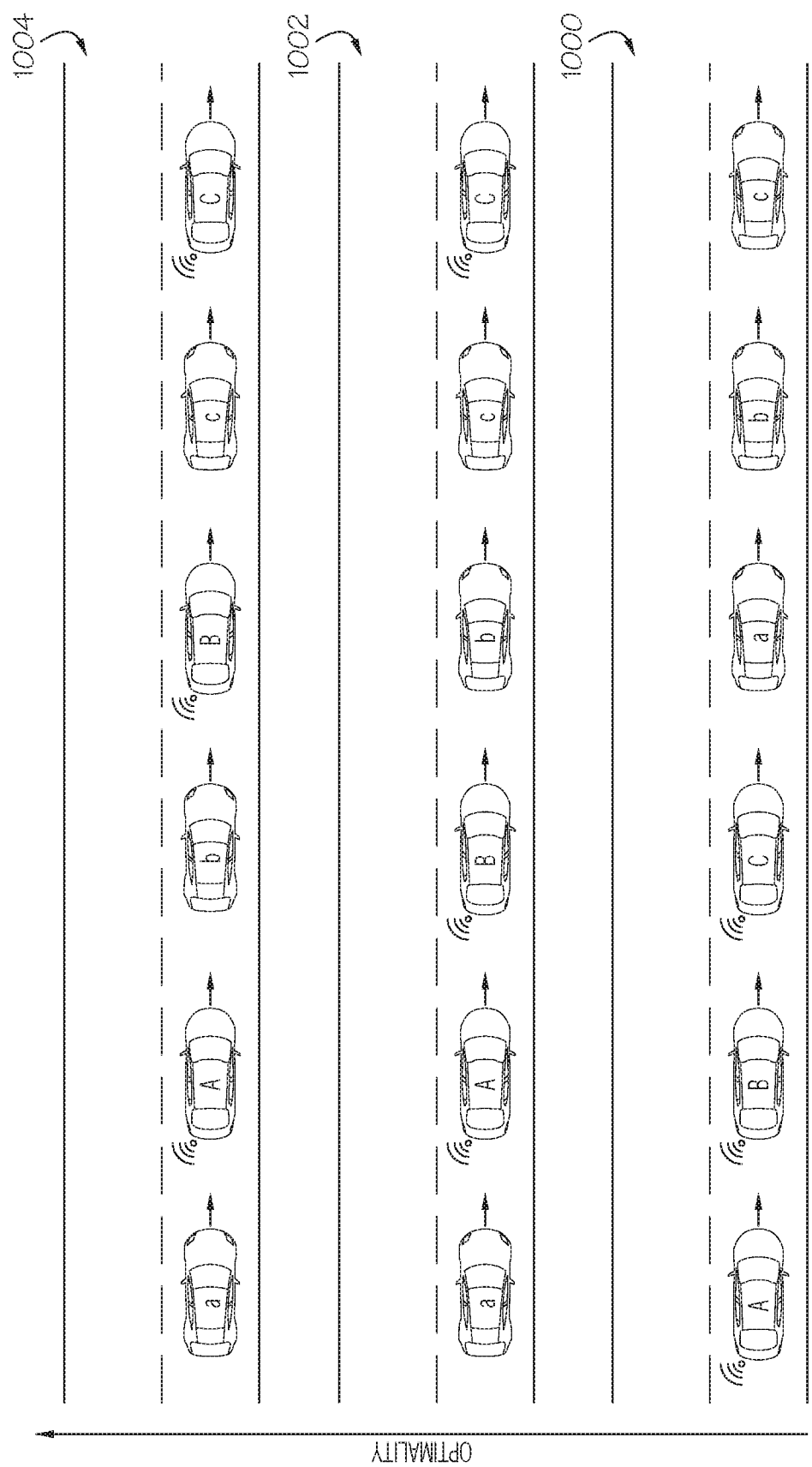
FIG. 10 depicts three possible vehicle configurations of connected and non-connected vehicles.

For example, FIG. 10 shows three different vehicle configurations involving six vehicles. Each of the vehicle configurations of FIG. 10 comprises three connected vehicles A, B and C and three non-connected vehicles a, b and c. In vehicle configuration 1000, the three connected vehicles A, b and C are positioned together consecutively and the three non-connected vehicles a, b and c are positioned together consecutively. As such, configuration 1000 is sub-optimal with respect to traffic flow because the three non-connected vehicles being clumped together may tend to magnify driving inefficiencies caused by human drivers without connected vehicle assistance.

In vehicle configuration 1002, non-connected vehicles b and are positioned together consecutively but non-connected vehicle a is separated from the other non-connected vehicles by connected vehicles A and B. As such, vehicle configuration 1002 may tend to have better performance with respect to traffic flow than vehicle configuration 1000 because there are only two non-connected vehicles together. As such, human driving inefficiencies are less likely to be magnified.

In vehicle configuration 1004, each of the non-connected vehicles a, b and c is separated from each other by a connected vehicle. As such, vehicle configuration 1004 may be an optimal configuration for a set of vehicles comprising three connected vehicles and three non-connected vehicles.

The vehicle configuration optimization module 416 may utilize a variety of techniques to determine an optimal vehicle configuration, as disclosed herein. In one example, the vehicle configuration optimization module 416 may determine a number of candidate vehicle configurations that may be achieved from a current vehicle configuration, and may perform a simulation of each candidate vehicle configuration to measure one or more performance metrics (e.g., traffic flow, fuel efficiency, etc.). For example, given a current vehicle configuration comprising three connected vehicles and three non-connected vehicles, the vehicle configuration optimization module 416 may determine vehicle configurations 1000, 1002, and 1004 of FIG. 10 as candidate vehicle configurations. The vehicle configuration optimization module 416 may consider additional arrangements of the six vehicles A, B, C, a, b and c of FIG. 10 as other candidate configurations. The vehicle configuration optimization module 416 may then perform a simulation of each of the candidate vehicle configurations 1000, 1002, 1004 (or other additional candidate configurations) to determine one or more performance metrics. The simulation results may then return determined performance metrics associated with each of the simulations. In embodiments, each simulation result may return a numerical value of one or more performance metrics associated with each simulation (e.g., an amount of time for the vehicle configuration to travel a certain distance as a measure of traffic flow). In some examples, the simulations may be performed remotely from the edge server 104 (e.g., by a cloud-based server).

In other examples, the vehicle configuration optimization module 416 may compare candidate vehicle configurations to a database of known vehicle configurations. Each known vehicle configuration may have one or more predetermined performance metrics associated with it. For example, the vehicle configurations 1000, 1002, and 1004 may all be stored in a database along with one or more numerical values comprising values of one or more performance metrics associated with each vehicle configuration (e.g., traffic flow, fuel efficiency, etc.). In these examples, the vehicle configuration optimization module 416 may determine a number of candidate vehicle configurations and may compare each candidate configuration to the known vehicle configurations in the database. The vehicle configuration optimization module 416 may, for each candidate configuration, determine which known vehicle configuration is most similar to the candidate configuration. The vehicle configuration optimization module 416 may then assign the performance metrics associated with the most similar known configuration to the candidate configuration. As such, the vehicle configuration optimization module 416 may estimate performance metrics for each of a number of candidate configurations. In some examples, a database of known candidate configurations may be stored in the database 410 in the edge server 104. In other examples, the database of known candidate configurations may be stored remotely from the edge server 104 (e.g., in a cloud-based server).

In some examples, the vehicle configuration optimization module 416 may utilize one of the above techniques to determine an optimal vehicle configuration given a current vehicle configuration. In one example, the vehicle configuration optimization module 416 may select a vehicle configuration that maximizes a particular performance metric (e.g., traffic flow or fuel efficiency). In other examples, the vehicle configuration optimization module 416 may weight different performance metrics and may select a vehicle configuration that maximizes a weighted value of multiple performance metrics. For example, the vehicle configuration optimization module 416 may assign a certain weight to traffic flow and another weight to fuel efficiency. The vehicle configuration optimization module 416 may then determine which vehicle configuration among a plurality of candidate configurations maximizes a combination of traffic flow and fuel efficiency given the assigned weights. Alternatively, in some examples, the vehicle configuration optimization module 416 may also consider costs of achieving vehicle configurations, as discussed below.

Figure 11:
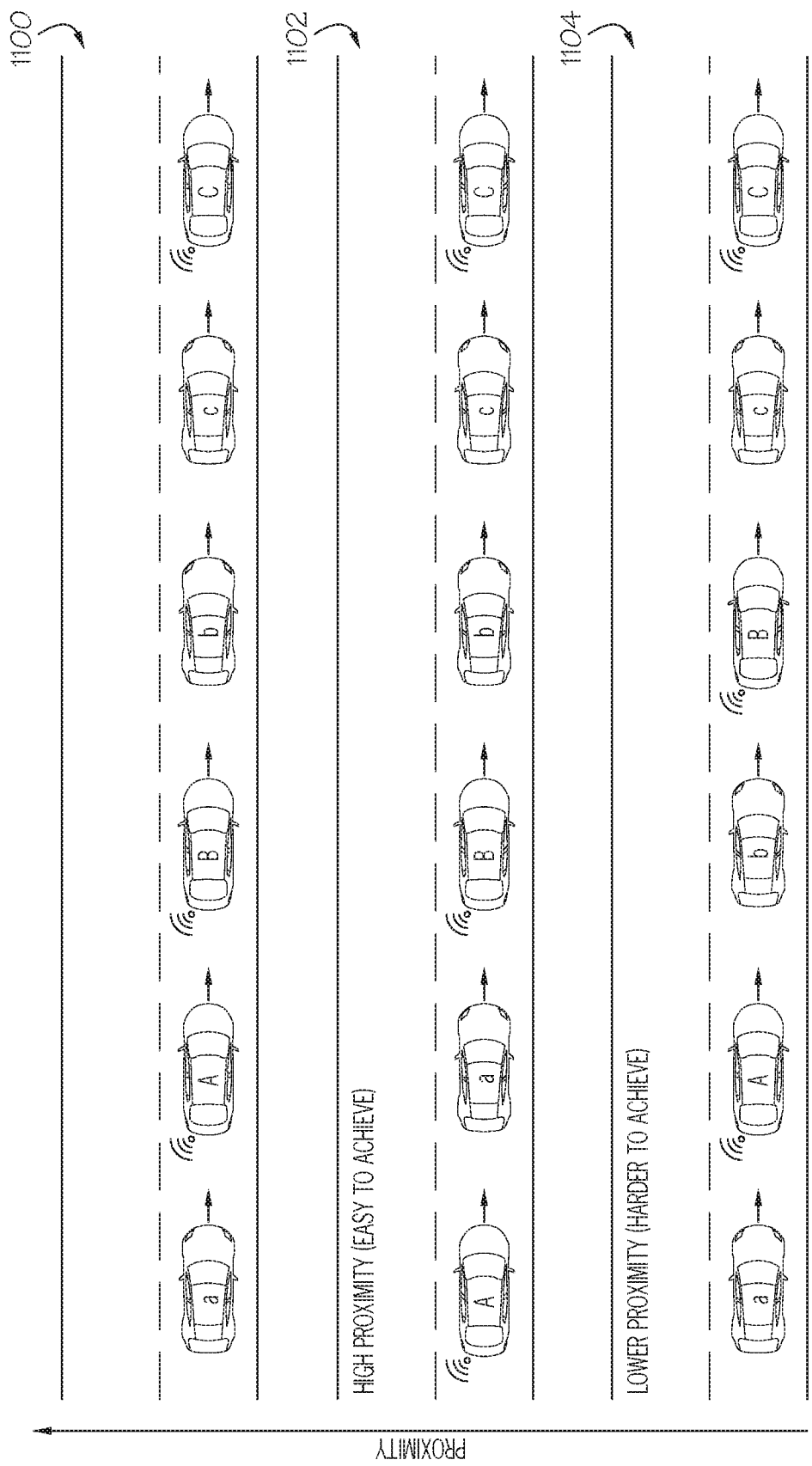
FIG. 11 depicts three possible vehicle configurations of connected and non-connected vehicles.

While it may be most desirable to achieve the most optimal vehicle configuration given a current vehicle configuration, there may be certain configurations that are more difficult to achieve than other configurations given a current vehicle configurations. For example, referring to FIG. 11, an initial vehicle configuration 1100 is shown comprising connected vehicles A, B and C and non-connected vehicles a, b, and c. Two candidate configuration 1102 and 1104 are shown as well. Given the initial vehicle configuration 1100, vehicle configuration 1102 can be achieved by having connected vehicle A move into the left lane, slow down to allow non-connected vehicle a to pass it, and then re-join the right lane behind non-connected vehicle a. Alternatively, achieving vehicle configuration 1104 from configuration 1100 requires connected vehicle B to move into the left lane, accelerate to pass non-connected vehicle b, and then re-join the right lane between non-connected vehicles b and c. Thus, it is more difficult to achieve vehicle configuration 1104 from initial vehicle configuration 1100 than it is to achieve vehicle configuration 1102 from initial vehicle configuration 1100 since achieving vehicle configuration 1104 requires additional acceleration by a connected vehicle and a more challenging lane change. As such, vehicle configuration 1102 has a higher proximity to configuration 1100 and vehicle configuration 1104 has a lower proximity to configuration 1100.

If one configuration is easier to achieve than another configuration, given a current vehicle configuration, it may be desirable to achieve the easier to achieve configuration rather than the more difficult configuration, even if the easier to achieve configuration is less optimal. This is because achieving a particular vehicle configuration requires certain costs (e.g., vehicle accelerations that use more fuel, possibility of error or accident, etc.). Accordingly, in some examples, the vehicle configuration optimization module 416 may consider the costs of achieving a vehicle configuration when determining a desired final vehicle configuration given an initial vehicle configuration.

In embodiments, the vehicle configuration optimization module 416 may determine a cost associated with achieving each of a plurality of candidate vehicle configurations given an initial vehicle configuration. The determined cost may comprise a number of factors. For example, the cost may comprise a total number of lane changes that need to be performed, a total amount of acceleration that needs to be performed across all vehicles (e.g., a total amount of energy that must be used), and the like. The vehicle configuration optimization module 416 may then weight one or more performance metrics and one or more costs associated with each of a plurality of a candidate vehicle configurations and determine an optimal vehicle configuration from among the candidate vehicle configurations based on the weighted performance metrics and the weighted costs.

In some examples, the vehicle configuration optimization module 416 may determine a feasibility of achieving a particular candidate vehicle configuration. In embodiments, the vehicle configuration optimization module 416 may determine feasibility based on one or more costs of achieving a particular vehicle configuration, as discussed above. For example, if achieving a particular vehicle configuration given an initial vehicle configuration requires a large amount of vehicles to perform complicated vehicle maneuvers, it may be desirable to instead select a different vehicle configuration that may be less optimal (in terms of traffic flow or other vehicle metrics) but that is easier to achieve. In some examples, the vehicle configuration optimization module 416 may determine that it is not feasible to achieve a particular vehicle configuration given an initial vehicle configuration if the costs of achieving that vehicle configuration (such as the costs discussed above) is above a predetermined threshold value.

In some examples, the vehicle configuration optimization module 416 may determine the costs of achieving a particular vehicle configuration based on the performance capabilities of one or more of the connected vehicles that would be required to perform vehicle maneuvers. For example, the vehicle configuration optimization module 416 may determine the acceleration capabilities of a connected vehicle when determining the costs associated with that vehicle perform certain vehicle maneuvers. In these examples, the connected vehicles may transmit performance capabilities to the RSU 102, which may be relayed to the edge server 104. The vehicle configuration optimization module 416 may consider vehicle performance when determining costs of achieving a vehicle configuration.

Referring back to FIG. 4, the vehicle command generation module 418 may determine one or more vehicle maneuvers to be performed by one or more connected vehicles to achieve an optimal vehicle configuration, as determined by the vehicle configuration optimization module 416, given a current vehicle configuration. For example, FIG. 12 shows an initial vehicle configuration 1200 comprising four connected vehicles, A, B, C and D and four non-connected vehicles a, b, c and d. FIG. 12 also shows a desired vehicle configuration 1202 that may be determined by the vehicle configuration optimization module 416.

Figure 14:
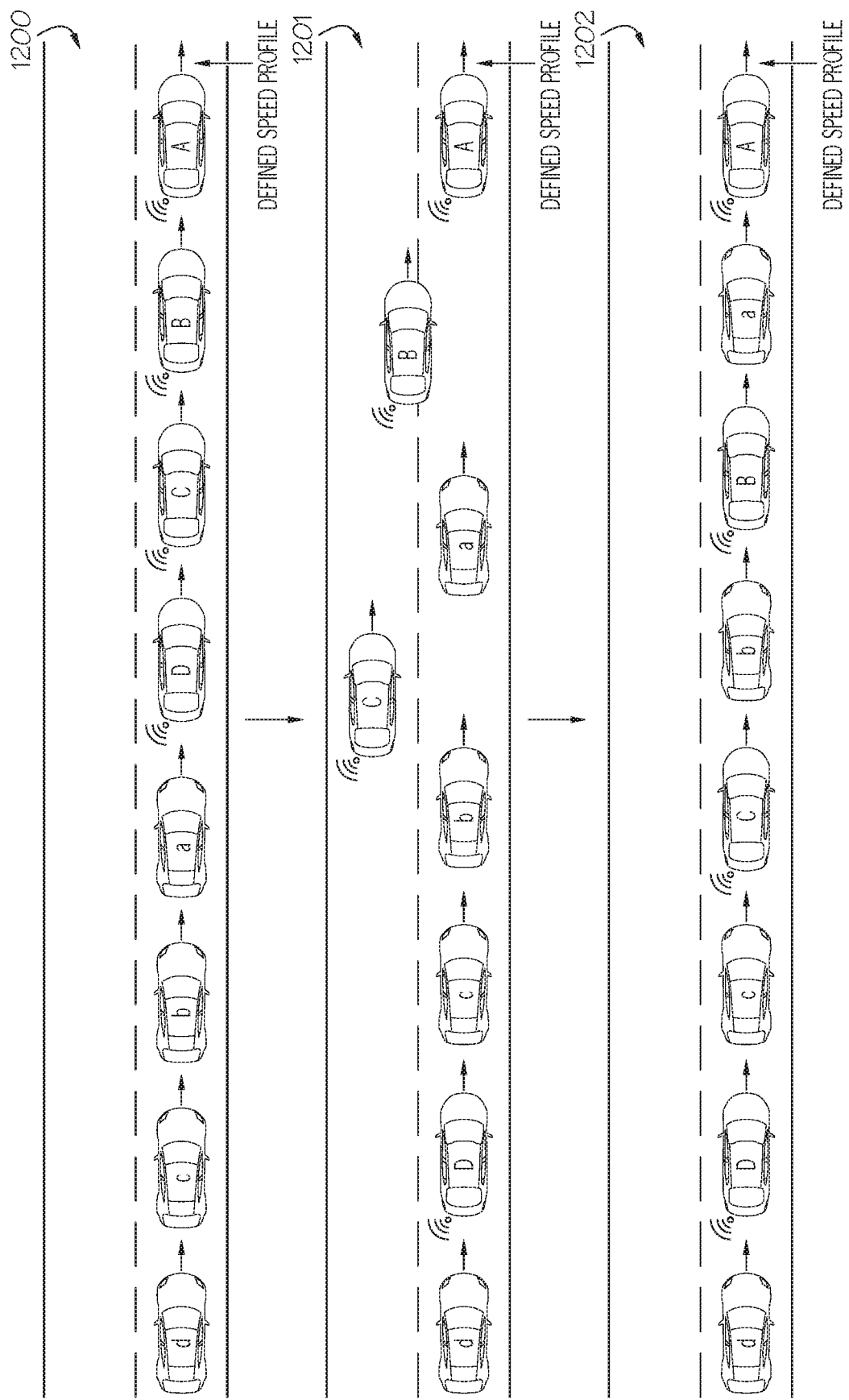
FIG. 14 depicts example driving maneuvers that may be performed by the vehicles of FIGS. 12 and 13.

FIG. 13 shows a procedure that may be followed such that the vehicles A, B, C, D, a, b, c and may transition from the vehicle configuration 1200 to the vehicle configuration 1202 in FIG. 12. As shown in FIG. 13, the procedure may involve connected vehicle D using the left lane to merge between non-connected vehicles c and d, connected vehicle C using the left lane to merge between non-connected vehicles b and c, connected vehicle B using the left land to merge between non-connected vehicles a and b, and connected vehicle A staying in its current lane and maintaining a specified speed. As such, the vehicle command generation module 418 may determine this procedure comprising instructions (e.g., vehicle maneuvers) for each of the connected vehicles A, B, C and D. FIG. 14 shows the initial vehicle configuration 1200 and the final desired vehicle configuration 1202 of FIG. 12, and an intermediate configuration 1201 that may be achieved while the connected vehicles A, B, C and D are performing vehicle instructions determined by the vehicle command generation module 418.

Referring back to FIG. 4, the vehicle command transmission module 420 may transmit the vehicle instructions determined by the vehicle command generation module 418 to the appropriate vehicles. That is, after the vehicle command generation module 418 determines driving instructions for each connected vehicle of an initial vehicle configuration, as described above, the vehicle command transmission module 420 may transmit each of these driving instructions to the appropriate connected vehicles to perform the driving maneuvers contained in the instructions. In some examples, the vehicle command transmission module 420 of the edge server 104 may transmit the vehicle instructions to the RSU 102, which may then relay the instructions to the appropriate vehicles.

Figure 5:
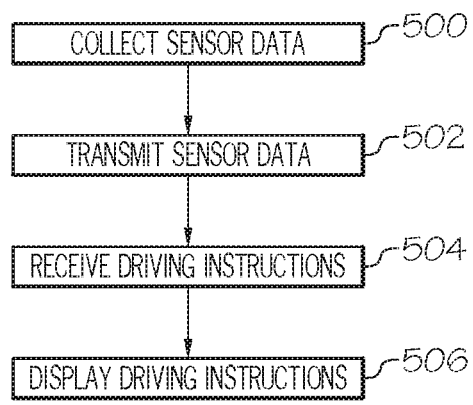
FIG. 5 depicts a flowchart for operating a connected human driven vehicle that may be part of the system of FIG. 1, according to one or more embodiments shown and described herein.

FIG. 5 depicts a flowchart for managing connected vehicles in mixed traffic that may be performed by a human-driven connected vehicle having the vehicle system 200 of FIG. 2. In step 500, the one or more sensors 210 of the vehicle system 200 may collect sensor data comprising information about the surroundings of the vehicle. The data captured by the sensors 210 may be used by the vehicle system 200 and/or the edge server 104 to identify locations of one or more vehicles on a road such that a vehicle configuration comprising one or more connected vehicles and/or one or more non-connected vehicles may be determined.

In step 502, the network interface hardware 212 may transmit the sensor data detected by the sensors 210 to the edge server 104. The network interface hardware 212 may also transmit a position of the connected vehicle to the edge server 104. The edge server 104 may use the sensor data to determine locations of vehicles in a vehicle configuration and the RSU 102 may use the position of the connected vehicles (along with positions received from other connected vehicles) to determine which vehicles in a vehicle configuration are connected vehicles and which are non-connected vehicles.

In step 504, the network interface hardware 212 may receive driving instructions from the edge server 104. The driving instructions may comprise driving maneuvers to be performed by the connected vehicle in order to achieve a desired vehicle configuration determined by the edge server 104.

In step 506, the driving instructions received by the network interface hardware 212 may be displayed such that they can be seen by the human driver. In some examples, the driving instructions may be displayed on a screen (e.g., a navigation system). In other examples, the driving instructions may be audibly read to the driver (e.g., by an audio navigation system). In other examples, the received driving instructions may be otherwise conveyed to the driver. The driver may then perform the driving maneuvers contained in the driving instructions in order to achieve the desired vehicle configuration determined by the edge server.

Figure 6:
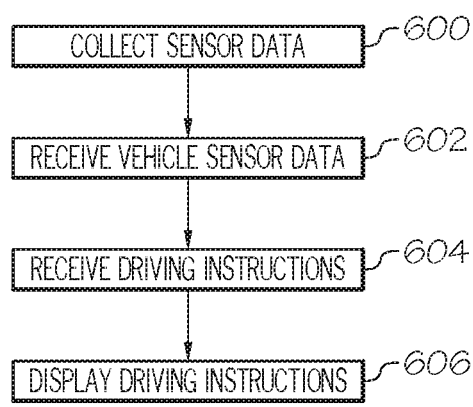
FIG. 6 depicts a flowchart for operating a connected autonomous vehicle that may be part of the system of FIG. 1, according to one or more embodiments shown and described herein.

FIG. 6 depicts a flowchart for managing connected vehicles in mixed traffic that may be performed by an autonomous connected vehicle having the vehicle system 200 of FIG. 2. In step 600, the one or more sensors 210 of the vehicle system 200 may collect sensor data comprising information about the surroundings of the vehicle. In step 602, the network interface hardware 212 may transmit the sensor data detected by the sensors 210 to the edge server 104. The network interface hardware 212 may also transmit a position of the connected vehicle to the edge server 104.

In step 604, the network interface hardware 212 may receive driving instructions from the edge server 104, which may comprise driving maneuvers to be performed by the connected vehicle in order to achieve a desired vehicle configuration determined by the edge server 104. In step 606, the driving maneuvers contained in the driving instructions may be performed by the autonomous vehicle. As such, the vehicle may autonomously perform the driving maneuvers to achieve the desired vehicle configuration determined by the edge server.

Figure 7:
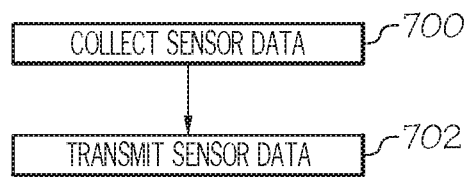
FIG. 7 depicts a flowchart for operating a roadside unit that may be part of the system of FIG. 1, according to one or more embodiments shown and described herein.

FIG. 7 depicts a flowchart for managing connected vehicles in mixed traffic that may be performed by the RSU 102. In step 700, the one or more sensors 308 of the RSU 102 may collect sensor data comprising information about vehicles traveling along a road portion. The sensor data may be received by the sensor data reception module 314. The sensor data reception module 314 may identify locations of one or more vehicles based on the received sensor data.

In step 702, the data transmission module 316 may transmit the sensor data received by the sensor data reception module 314 and/or vehicle locations determined by the sensor data reception module 314 to the edge server 104.

Figure 8:
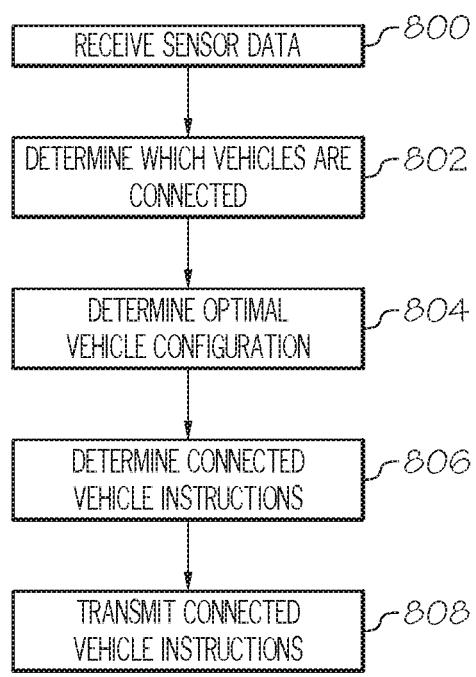
FIG. 8 depicts a flowchart for operating an edge server that may be part of the system of FIG. 1, according to one or more embodiments shown and described herein.

FIG. 8 depicts a flowchart for managing connected vehicles in mixed traffic that may be performed by the edge server 104. In step 800, the data reception module 412 of the edge server 104 may receive sensor data from one or more connected vehicles and from the RSU 102. The received sensor data may comprise locations of one or more vehicles in a vehicle configuration. The data reception module 412 may also receive self-identified positions of the connected vehicles transmitting sensor data. In some examples, the edge server 104 receives sensor data only from connected vehicles and in other examples, the edge server 104 receives sensor data only from the RSU 102.

In step 802, the connected vehicle determination module 414 may determine which vehicles identified in the data received by the data reception module 412 are connected vehicles and which vehicles are non-connected vehicles. The connected vehicle determination module 414 may make this determination based on the locations of identified vehicles received by the data reception module 412 and the self-identified locations of connected vehicles received by the data reception module 412. In some examples, the data received by the data reception module 412 may directly identify which vehicles are connected and non-connected vehicles and, in these examples, step 802 may be omitted.

In step 804, the vehicle configuration optimization module 416 may determine an optimal vehicle configuration for the vehicles identified in the sensor data received by the data reception module 412 based on the initial vehicle configuration and one or more optimization criteria. The optimization criteria may include one or more performance metrics to be achieved by the optimal vehicle configuration and one or more costs required to achieve the optimal vehicle configuration from the initial vehicle configuration. Accordingly, the vehicle configuration optimization module 416 may formulate an optimization problem based on the optimization criteria and may then solved the optimization problem to determine the optimal vehicle configuration. As explained above, the vehicle configuration optimization module 416 may solve the optimization problem by simulating candidate vehicle configurations, comparing candidate vehicle configurations to known configurations in a look-up table, or using other methods.

In step 806, the vehicle command generation module 418 may determine driving instructions comprising vehicle maneuvers to be performed by the connected vehicles in the initial vehicle configuration to reach the desired optimal vehicle configuration. Then, in step 808, the vehicle command transmission module 420 may transmit the determined driving instructions to the appropriate connected vehicles.

Figure 15:
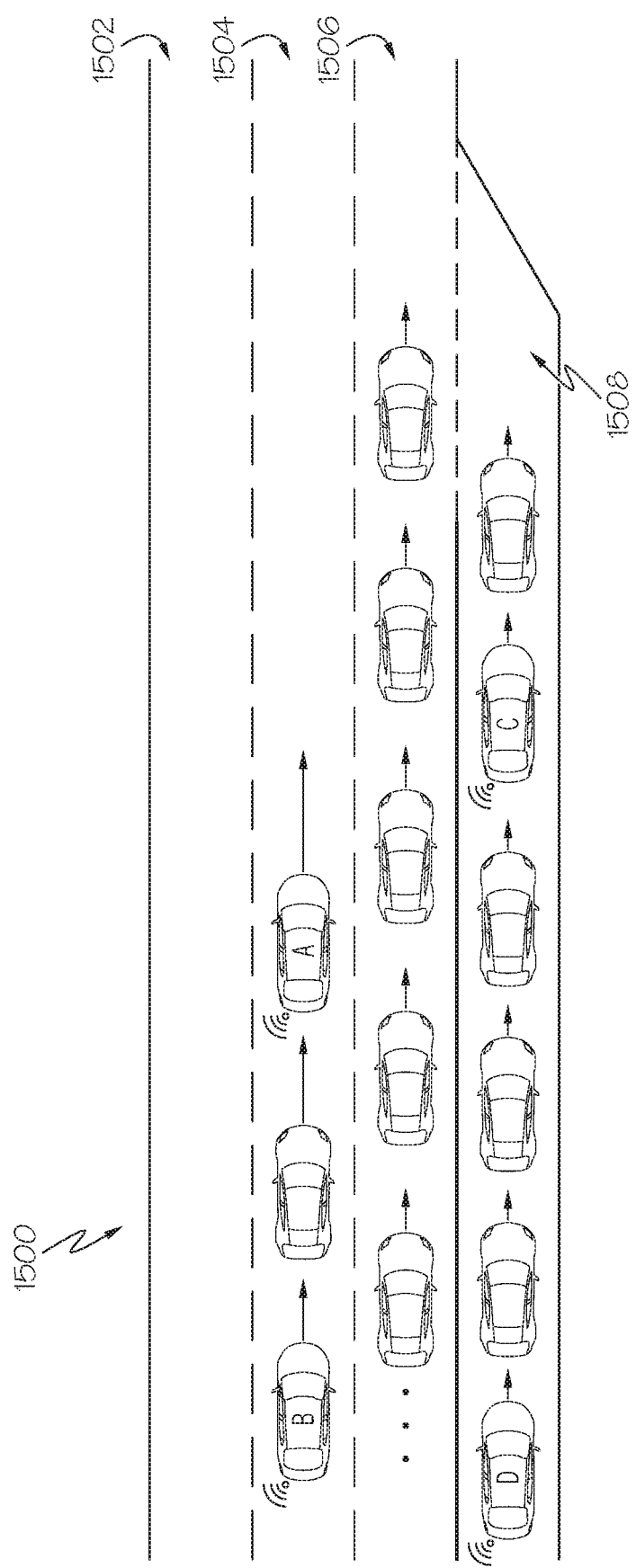
FIG. 15 depicts an example driving situation involving connected and non-connected vehicles.

FIG. 15 shows an example situation of managing connected vehicles in mixed traffic involving a freeway 1500 comprising lanes 1502, 1504, and 1506 and an on-ramp 1508. In the example of FIG. 15, a connected vehicle A, a connected vehicle B, and one non-connected vehicle are driving in lane 1504 and a plurality of non-connected vehicles are driving in lane 1506. In addition, a connected vehicle C, a connected vehicle D, and a plurality of non-connected vehicles are attempting to merge onto the freeway 1500 using the on-ramp 1508.

Figure 16:
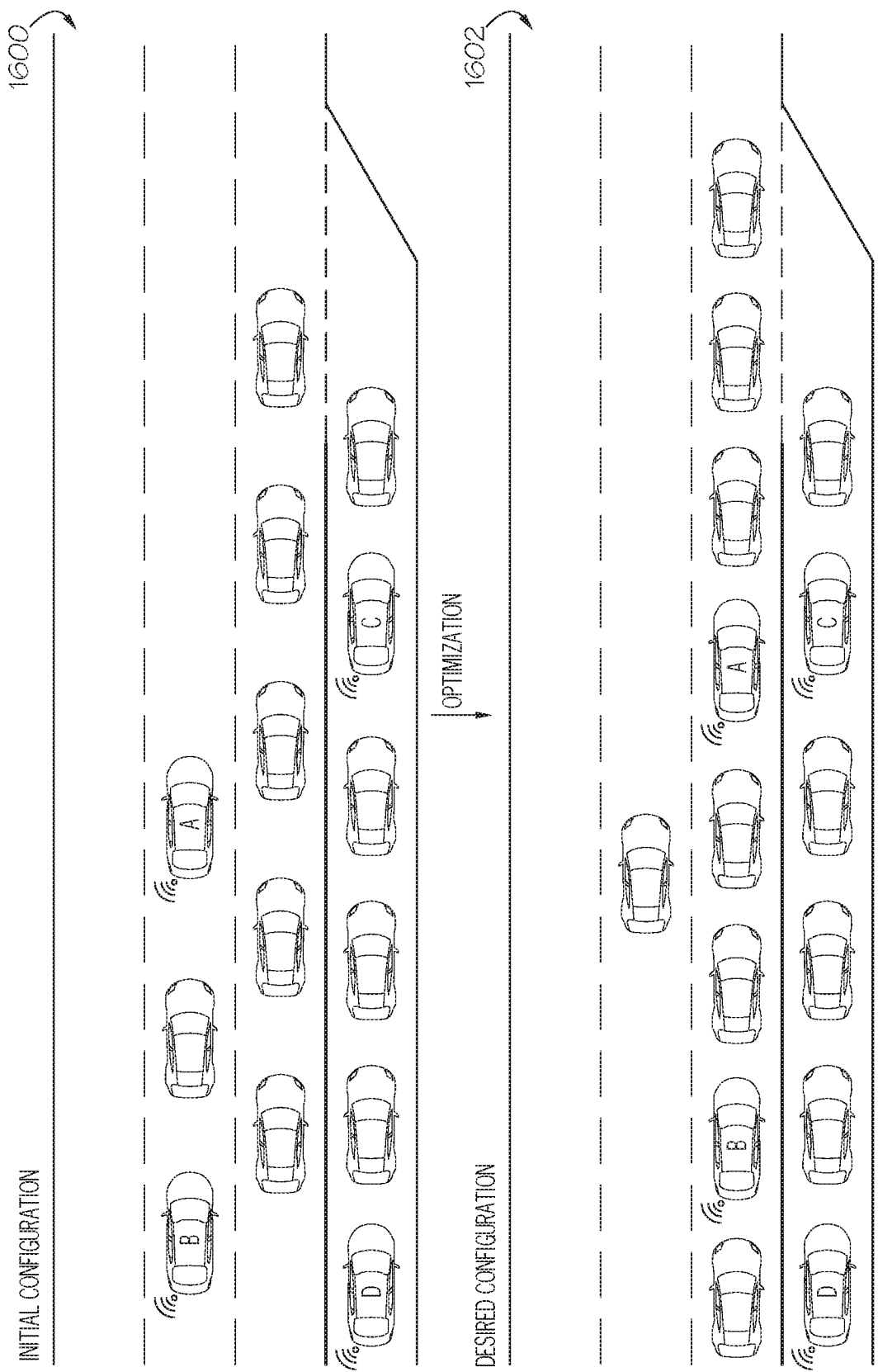
FIG. 16 depicts an example initial configuration and example desired configuration for the driving situation of FIG. 15.

In the example of FIG. 1500, the vehicle configuration optimization module 416 may determine a desired vehicle configuration to minimize the time required for the vehicles to merge onto the freeway 1500 to ensure a high flow of traffic on the freeway 1500. Accordingly, the vehicle configuration optimization module 416 may use the above techniques to determine an optimal configuration. In the example of FIG. 15, the vehicle configuration optimization module 416 may determine that the optimal configuration is to insert connected vehicles A and B into the lane 1506. Then, the connected vehicles A and B may be able to adjust their speed to allow for the merging vehicles to easily merge onto the freeway 1500. Thus, FIG. 16 shows an initial vehicle configuration 1600, corresponding to the vehicle configuration of FIG. 15, and a desired vehicle configuration 1602 that may be determined by the vehicle configuration optimization module 416.

Figure 17:
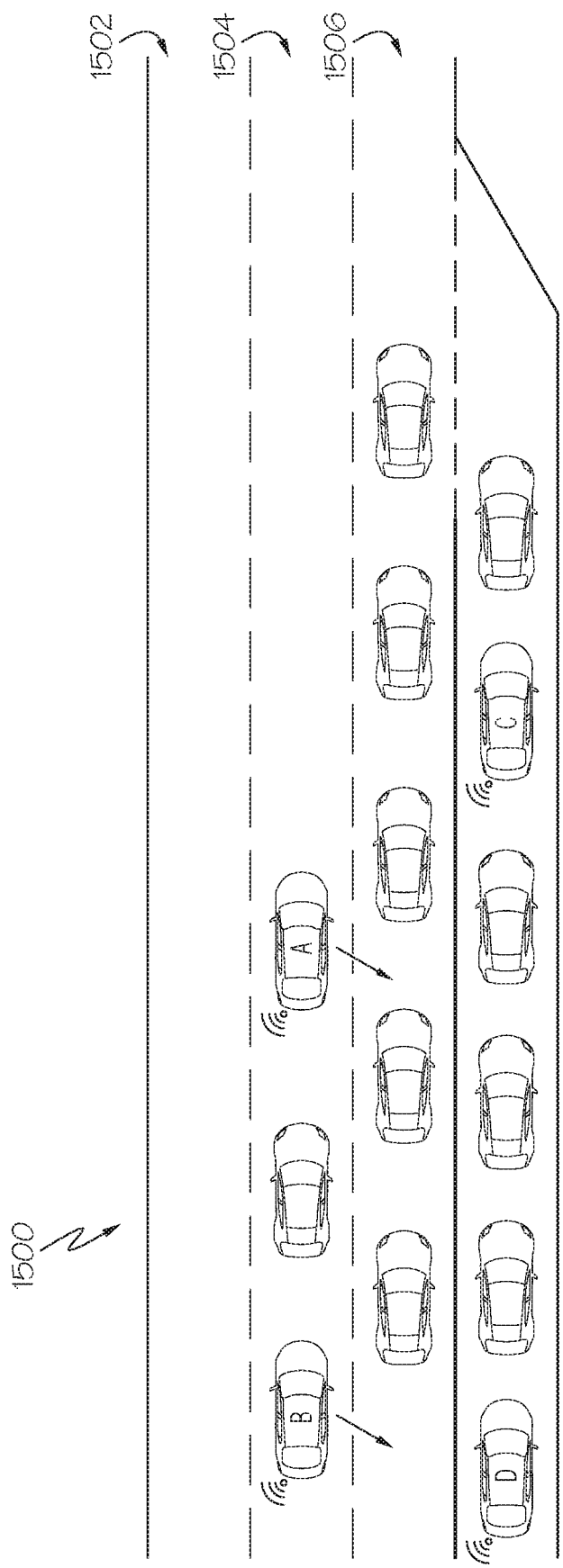
FIG. 17 depicts example driving instructions for the vehicles of FIG. 16 to transition from the initial configuration to the desired configuration.

FIG. 17 shows a visualization of driving maneuvers that may be performed by connected vehicles A and B to achieve the desired vehicle configuration 1602 from the initial vehicle configuration 1600. Namely, connected vehicles A and B should merge into lane 1506 from lane 1504. Accordingly, the vehicle command generation module 418 may determine these driving maneuvers to be performed by vehicles A and B and the vehicle command transmission module 420 may transmit these driving instructions to vehicles A and B.

Figure 18:
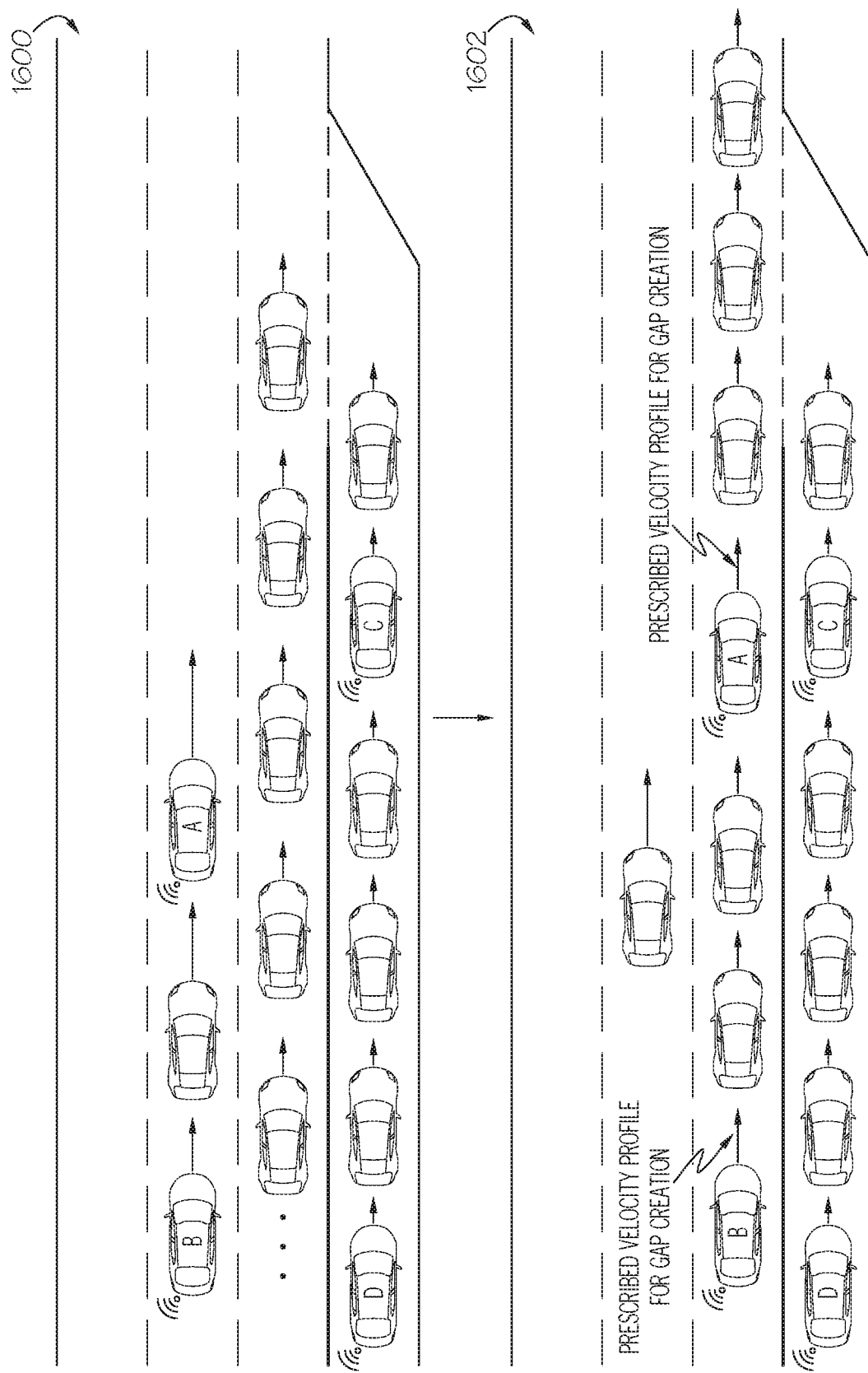
FIG. 18 depicts connected vehicles in the initial vehicle configuration and in the optimal vehicle configuration.

FIG. 18 shows the connected vehicles A and B in the initial vehicle configuration 1600 and in the desired vehicle configuration 1602. Once the connected vehicles A and B are in the optimal vehicle configuration, they may adjust their speed in order to allow for the connected vehicles C and D and the non-connected vehicles merging onto the freeway 1500 to easily merge, thereby increasing traffic flow.

It should now be understood that embodiments described herein are directed to methods and systems for managing connected vehicles in mixed traffic. Connected vehicles may gather sensor data to identify other vehicles on the road. A roadside unit may also gather sensor data to identify vehicles on the road. The connected vehicles and the roadside unit may transfer the gathered sensor data to an edge server. The edge server may determine an initial vehicle configuration based on the received sensor data. The initial vehicle configuration may comprise a particular arrangement of connected and non-connected vehicles.

The edge server may then determine an optimal vehicle configuration of the connected and non-connected vehicles in the initial vehicle configuration that optimizes certain optimization criteria. The optimization criteria may include one or more performance metrics of a final vehicle configuration (e.g., traffic flow) and one or more costs required to achieve the final vehicle configuration (e.g., total amount of accelerations to be performed by connected vehicles in reaching the final vehicle configuration). The edge server may solve an optimization problem to determine an optimal final vehicle configuration based on the initial vehicle configuration and the optimization criteria.

After determining an optimal vehicle configuration, the edge server may determine driving maneuvers to be performed by the connected vehicles in the initial vehicle configuration to reach the optimal vehicle configuration. The edge server may transmit driving instructions comprising the determined driving maneuvers to the appropriate connected vehicles. The connected vehicles may receive the driving instructions and may perform the driving maneuvers contained therein. For autonomous connected vehicles, the vehicles may perform the driving maneuvers autonomously. For human driven connected vehicles, the vehicles may display the driving maneuvers to a driver who may perform the displayed driving maneuvers. After all of the connected vehicles have performed the appropriate driving maneuvers, the optimal vehicle configuration may be achieved.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving, from connected vehicles, first locations of a first set of vehicles in an initial vehicle configuration, wherein a connected vehicle is able to communicate with one or more systems outside of the connected vehicle;
   receiving, from a roadside unit, second locations of a second set of vehicles in the initial vehicle configuration;
   determining locations of connected vehicles and non-connected vehicles in the initial vehicle configuration based on the first and the second locations, wherein the connected vehicles and non-connected vehicles are within a lane and two connected vehicles of the connected vehicles are not intervened by a non-connected vehicle in the initial vehicle configuration;
   determining an optimal vehicle configuration comprising a desired sequence of the connected vehicles and the non-connected vehicles within the lane based on the locations of the connected vehicles and the non-connected vehicles in the initial vehicle configuration and predetermined optimization criteria, the optimal vehicle configuration being such that one of the non-connected vehicles is interposed between the two connected vehicles;
   determining driving maneuvers to be performed by the connected vehicles to achieve the optimal vehicle configuration; and
   transmitting the determined driving maneuvers to the connected vehicles, thereby causing the connected vehicles to perform the driving maneuvers.

2. The method of claim 1, wherein the initial vehicle configuration comprises connected vehicles and non-connected vehicles.

3. The method of claim 1, further comprising:
   determining the optimal vehicle configuration by solving an optimization problem based on the first locations, the second locations, and the predetermined optimization criteria.

4. The method of claim 1, wherein the predetermined optimization criteria comprises one or more performance metrics associated with a vehicle configuration.

5. The method of claim 4, wherein at least one of the one or more performance metrics comprises traffic flow associated with a vehicle configuration.

6. The method of claim 4, wherein at least one of the one or more performance metrics comprises fuel efficiency associated with a vehicle configuration.

7. The method of claim 1, wherein the predetermined optimization criteria comprises one or more costs associated with achieving a vehicle configuration from the initial vehicle configuration.

8. The method of claim 7, wherein at least one of the costs comprises a total amount of acceleration to be performed by the connected vehicles to achieve a vehicle configuration from the initial vehicle configuration.

9. The method of claim 1, wherein the predetermined optimization criteria comprises weighted values of one or more performance metrics associated with a vehicle configuration and one or more weighted values of costs associated with achieving the vehicle configuration from the initial vehicle configuration.

10. The method of claim 1, further comprising:
selecting a plurality of candidate vehicle configurations that may be achieved from the initial vehicle configuration;
simulating performance of each of the candidate vehicle configurations to obtain simulation results;
determining one or more performance metrics associated with each of the candidate vehicle configurations based on the simulation results; and
determining a vehicle configuration from among the plurality of candidate vehicle configurations as the optimal vehicle configuration based on the simulation results.

11. The method of claim 10, further comprising:
determining one or more costs associated with achieving each of the candidate vehicle configurations from the initial vehicle configuration; and
determining a vehicle configuration from among the plurality of candidate vehicle configurations as the optimal vehicle configuration based on the simulation results and the costs.

12. The method of claim 11, further comprising:
determining whether the costs associated with achieving each of the candidate vehicle configurations is above a predetermined feasibility threshold; and
determining a vehicle configuration from among the plurality of candidate vehicle configurations in which the costs are not above the predetermined feasibility threshold based on the simulation results as the optimal vehicle configuration.

13. The method of claim 1, further comprising:
selecting a plurality of candidate vehicle configurations that may be achieved from the initial vehicle configuration;
comparing each of the candidate vehicle configurations to known vehicle configurations in a database having known performance metrics;
estimating performance metrics for each of the candidate vehicle configurations based on a similarity of the candidate vehicle configurations to the known vehicle configurations; and
determining a vehicle configuration from among the plurality of candidate vehicle configurations as the optimal vehicle configuration based on the estimated performance metrics.

14. A server comprising a controller configured to:
receive, from connected vehicles, first locations of a first set of vehicles in an initial vehicle configuration, wherein a connected vehicle is able to communicate with one or more systems outside of the connected vehicle;
receive, from a roadside unit, second locations of a second set of vehicles in the initial vehicle configuration;
determine locations of connected vehicles and non-connected vehicles in the initial vehicle configuration based on the first locations and the second locations, wherein the connected vehicles and non-connected vehicles are within a lane and two connected vehicles of the connected vehicles are not intervened by a non-connected vehicle in the initial vehicle configuration;
determine an optimal vehicle configuration comprising a desired sequence of the connected vehicles and the non-connected vehicles within the lane based on the locations of the connected vehicles and the non-connected vehicles in the initial vehicle configuration, and predetermined optimization criteria, the optimal vehicle configuration being such that one of the non-connected vehicles is interposed between the two connected vehicles;
determine driving maneuvers to be performed by the connected vehicles to achieve the optimal vehicle configuration; and
transmit the determined driving maneuvers to the connected vehicles, thereby causing the connected vehicles to perform the driving maneuvers.

15. The server of claim 14, wherein the predetermined optimization criteria comprises one or more performance metrics associated with a vehicle configuration.

16. The server of claim 14, wherein the predetermined optimization criteria comprises one or more costs associated with achieving a vehicle configuration from the initial vehicle configuration.

17. The server of claim 14, wherein the controller is further configured to:
select a plurality of candidate vehicle configurations that are achieved from the initial vehicle configuration;
simulate performance of each of the candidate vehicle configurations to obtain simulation results;
determine one or more performance metrics associated with each of the candidate vehicle configurations based on the simulation results; and
determine a vehicle configuration from among the plurality of candidate vehicle configurations as the optimal vehicle configuration based on the simulation results.

18. The server of claim 17, wherein the controller is further configured to:
determine one or more costs associated with achieving each of the candidate vehicle configurations from the initial vehicle configuration; and
determine a vehicle configuration from among the plurality of candidate vehicle configurations as the optimal vehicle configuration based on the simulation results and the costs.

19. The server of claim 18, wherein the controller is further configured to:
determine whether the costs associated with achieving each of the candidate vehicle configurations is above a predetermined feasibility threshold; and
determine a vehicle configuration from among the plurality of candidate vehicle configurations in which the costs are not above the predetermined feasibility threshold based on the simulation results as the optimal vehicle configuration.

20. The server of claim 14, wherein the controller is further configured to:
select a plurality of candidate vehicle configurations that may be achieved from the initial vehicle configuration;
compare each of the candidate vehicle configurations to known vehicle configurations in a database having known performance metrics;
estimate performance metrics for each of the candidate vehicle configurations based on a similarity of the candidate vehicle configurations to the known vehicle configurations; and determine a vehicle configuration from among the plurality of candidate vehicle configurations as the optimal vehicle configuration based on the estimated performance metrics.

* * * * *

UNITED STATES PATENT AND TRADEMARK OFFICE
CERTIFICATE OF CORRECTION

PATENT NO. : 11,995,990 B2
APPLICATION NO. : 17/069133
DATED : May 28, 2024
INVENTOR(S) : Sergei S. Avedisov and Ahmed Hamdi Sakr It is certified that error appears in the above-identified patent and that said Letters Patent is hereby corrected as shown below:

On the Title Page

In page 2, Column 2, item (56), other publications, cite no 9, delete "JIN I. GE et al" and insert --JIN I. GE et al.--, therefor.

In the Specification

In Column 16, Line 36, delete "solved" and insert --solve--, therefor.

Signed and Sealed this
Ninth Day of July, 2024

Katherine Kelly Vidal
*Director of the United States Patent and Trademark Office*